United States Patent [19]

Medlar

[11] 3,897,272

[45] July 29, 1975

[54] STURDY SENSING APPARATUS FOR MEASURING THE TEMPERATURE OF A HEATED RUBBER MATERIAL DURING ITS CURING PROCESS AND METHOD FOR MAKING SAME

[75] Inventor: Lewis A. Medlar, Oreland, Pa.

[73] Assignee: Honeywell Inc., Minneapolis, Minn.

[22] Filed: July 29, 1974

[21] Appl. No.: 492,989

[52] U.S. Cl. .................... 136/230; 29/592; 73/15 R; 73/359; 136/201;

[51] Int. Cl. ..... G01k 1/14; G01k 7/04; H01v/11/04

[58] Field of Search ............................ 73/15 R, 359; 136/230–235, 242; 29/592

[56] References Cited

UNITED STATES PATENTS

| | | | |
|---|---|---|---|
| 3,283,580 | 11/1966 | Nanigian et al. | 73/359 |
| 3,570,078 | 5/1971 | MacKenzie | 73/359 X |
| 3,713,339 | 1/1973 | Medlar | 73/359 |
| 3,718,721 | 2/1973 | Gould et al. | 73/15 R X |
| 3,779,078 | 12/1973 | Kaesser et al. | 73/343 R |
| 3,811,958 | 5/1974 | Maurer | 136/233 |

FOREIGN PATENTS OR APPLICATIONS

| | | | |
|---|---|---|---|
| 587,996 | 5/1947 | United Kingdom | 73/15 R |

*Primary Examiner*—Jerry W. Myracle
*Assistant Examiner*—Frederick Shoon
*Attorney, Agent, or Firm*—Arthur H. Swanson; Lockwood D. Burton; John Shaw Stevenson

[57] ABSTRACT

A durable sensor for accurately measuring the temperature of heated rubber material in a curing mold is made of a sturdy construction to withstand the mechanical stress that is applied to it while each successive cured part is stripped from the mold and from about the sensor. The sensor includes a probe on which a pair of wires forming a thermocouple are mounted. The probe has the same thermal characteristics as the rubber material under measurement. A thin support sleeve which is thermally isolated from the mold protects and strengthens the probe. This construction prohibits any heat emitted by the mold from adversely affecting the accuracy of the measurement of the temperature of the rubber material.

7 Claims, 5 Drawing Figures

76
75
74
22
80
70
16
10
12
63
68
72
66
78

63
18
22
40
64
10
36
26
12
16
32
14
30
34
24
28
60
38
36

48
34
16
22
54
50
62
56
30
12
18
20
60
58
34
52

12
24

54
63
48
42
18
56
14
50
20
40
58
52

STURDY SENSING APPARATUS FOR MEASURING THE TEMPERATURE OF A HEATED RUBBER MATERIAL DURING ITS CURING PROCESS AND METHOD FOR MAKING SAME

CROSS REFERENCE TO RELATED PATENTS

Cross reference is made to U.S. Pat. No. 3,713,339 issued to the inventor invention on Jan. 30, 1973, over which the present invention is an improvement.

BACKGROUND OF THE INVENTION

1. FIELD OF THE INVENTION

The present invention relates to improvements in temperature sensing apparatus. More specifically, the present invention relates to a durable sensing apparatus that is particularly useful in accurately measuring the temperature of a heated rubber material during the curing process in a mold.

2. DESCRIPTION OF THE PRIOR ART

An early step in the manufacture of a rubber article, such as a tire, has heretofore been to place the outer wall surfaces of a ring of uncured rubber and other associated ingredients against a heated tire mold. An expandable bag is brought into contact with the inner wall of the uncured rubber ring and hot liquid or steam is forced into the bag under pressure to cause the bag and the uncured rubber ring to be expanded in a radially outward direction against the mold to shape the ring of rubber into the form of a tire.

As heat continues to be applied to the rubber in the aforementioned manner by the mold, it will be gradually changed from an uncured or soft non-resilient dough-like state to a desired cured state.

Since the curing of the rubber is a function of the temperature to which it is raised, it is necessary to provide a sensing apparatus which can be mounted on such a mold and project into the rubber material in the mold whereby an accurate indication of the temperature of this rubber material, itself, can be continuously sensed during the curing process in order to ascertain when the rubber material passes from an uncured to a cured state.

It is also necessary for this sensing apparatus to be so constructed that it can withstand the relatively high mechanical stress that is applied to it by the tire, into which its temperature sensing end is inserted, while the cured tire is forceably removed by a stripping operation from the mold and as the tire is simultaneously moved away from the temperature sensing end of the sensing apparatus.

Experience has shown that tires which are not sufficiently cured fail and must be replaced by tire manufacturers because they have an abnormally short life due to their poor wear resistance characteristics.

It has been difficult for rubber tire manufacturers to determine the time at which the heated rubber material in a mold is changed from an undesired, uncured state to a desired cured state because the sensors that have heretofore been used could not be relied upon to give an accurate temperature measurement of the rubber material, itself. Even though the previously mentioned U.S. Pat. No. 3,713,339 discloses a sensor which can be relied upon to give an accurate measurement of the temperature of rubber material in the mold, that sensor has been found to be deficient in that that sensor has a potential to bend, crack and/or break due to high stress that is applied to it while each cured tire is removed by a stripping operation from the mold and moved away from the temperature sensing end of the sensing apparatus.

SUMMARY OF THE INVENTION

It is an object of the present invention to provide an improved sensing apparatus which avoids the shortcomings of the prior art temperature sensors.

It is another object of the invention to provide a temperature sensing probe having a support sleeve which is thermally isolated from the hot mold in which it is supported.

It is a further object of the invention to provide a temperature sensing probe having a support sleeve as aforementioned, and which is of a relatively small diameter.

In accomplishing these and other objects, there has been provided, in accordance with the present invention, a sensing apparatus in the form of a probe having an electrically conductive sensing element, e.g., a thermocouple supported thereon. The probe with the associated thermocouple is adapted for inserting in an opening in a wall of a tire mold whereby an end portion of the probe carrying a hot junction portion of the thermocouple is brought into physical contact with the uncured rubber material in the mold to sense accurately the curing temperature of the rubber. A metal sleeve, thermally isolated from the hot tire mold by means of an insulator, is positioned around an outer surface of the probe and is in spaced relationship with insulated portions of the thermocouple leads to give the probe added strength whereby the probe will be less likely to bend, crack or break as the cured rubber, or tire is stripped from the mold after each curing operation.

The probe is made of a material which has approximately the same thermal transmitting characteristics as the rubber material thereby to enable the temperature of the probe to be kept at substantially the same level as the rubber material to avoid adversely affecting the local temperature of the rubber material.

BRIEF DESCRIPTION OF THE DRAWING

A better understanding of the present invention may be had from the following description when read in connection with the accompanying drawings in which.

DESCRIPTION OF THE PREFERRED EMBODIMENT

Figure 1:
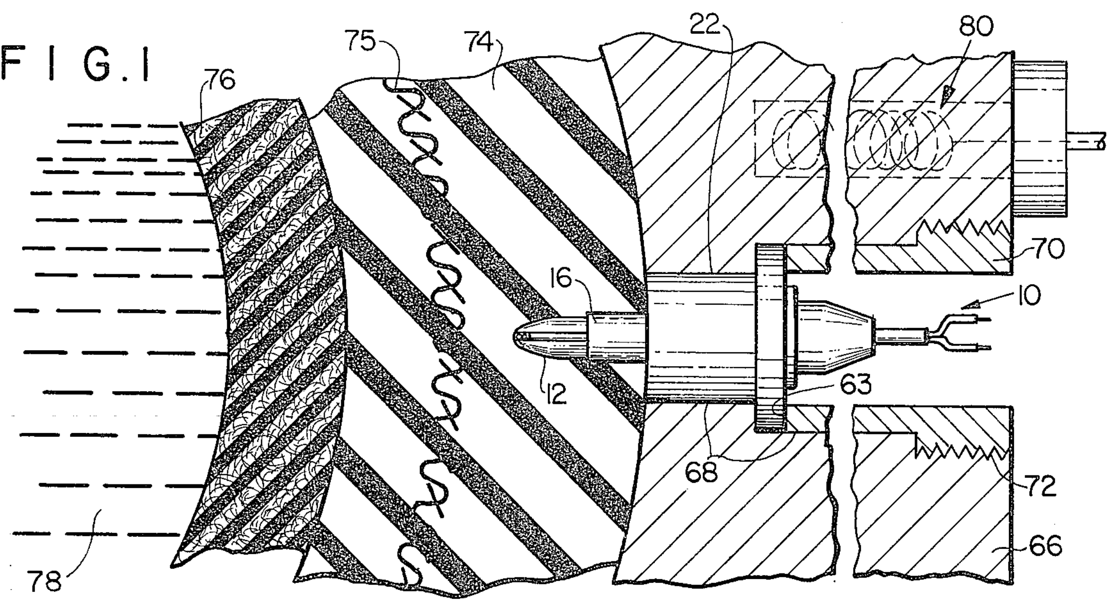
FIG. 1 is a cross-sectional view of a rubber mold and illustrating a temperature sensing apparatus constructed in accordance with the present invention.
Figure 2:
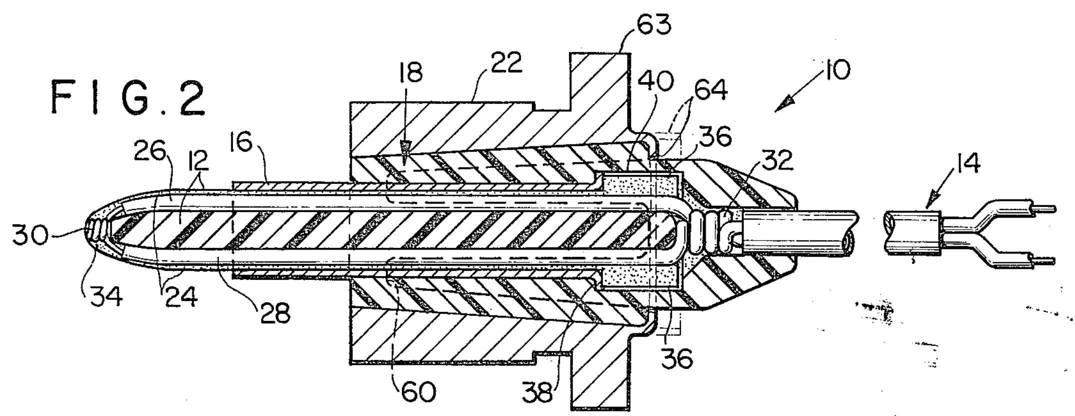
FIG. 2 shows a cross-sectional view of the temperature sensing apparatus taken along the longitudinal center line of FIG. 1.
Figure 4:
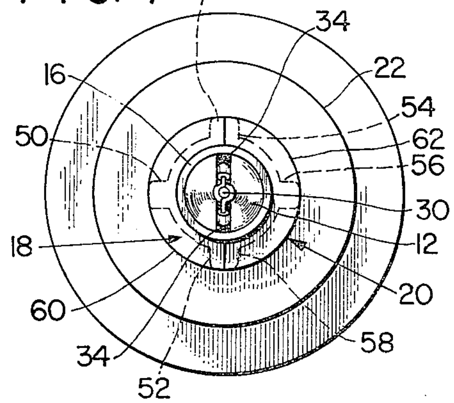
FIG. 4 is a view from one end of the temperature sensing apparatus shown in FIG. 2.

For an understanding of the preferred embodiment of the invention, reference will be first made in FIGS. 1, 2 and 4.

An exemplary temperature sensing apparatus or sensor 10 constructed in accordance with the present invention includes a glass-filled polysulfone support member or probe 12, a thermocouple cable 14, a thin wall sleeve 16 made of a rigid high strength material, a two part, longitudinally divided, thermal insulator 18, 20 made of glass-filled polysulfone, and a bushing 22 made of an aluminum alloy or the like.

Figure 3:
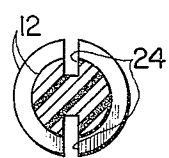
FIG. 3 is a end view of the thermocouple support member shown in FIG. 2.

The support member or probe 12 in FIGS. 1 and 3 has a continuous groove 24 that extends along the entire upper longitudinal surface, around the free end and along the entire lower longitudinal surface thereof.

The thermocouple cable 14 is comprised of a pair of insulated wires 26, 28, which in the present case are preferably very fine wires, positioned in the base of the groove 24 formed in the upper and lower surfaces of the probe 12.

Each of the fine wires 26, 28 of the thermocouple cable 14 are welded at the end portions 30 together to form a thermocouple junction. The end 32 of the wires 26, 28 adjacent the end of the probe 12 remote from the junction 30 are shown twisted. The insulated portion of thermocouple wires 26, 28 are thus held in firm contact with the base of the continuous groove 24 in the probe 12. The portion of the space in the groove 24 not occupied by the thermocouple wires 26, 28 is filled with a thermally insulating cement 34. the exposed temperature sensing or hot junction end 30 is the only surface of the thermocouple in the probe 12 that is not shown covered by the cement 34.

The probe 12 has an enlarged end or shoulder 36 through which a portion of the groove 24 extends to accommodate the passage of the T/C lead wires there through. The sleeve 16 preferably made of type 304 stainless steel tubing surrounds a major outer surface of the probe 12 and has a flange 38 on the end in contact with the shoulder 36 of the probe 12.

Figure 5:
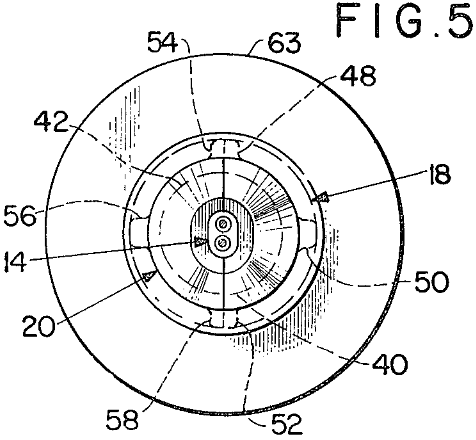
FIG. 5 is a view of the temperature sensing apparatus as seen from the opposite end relative to FIG. 4.

As is shown in FIGS. 2 and 5, each half of the two part insulator 18, 20 is internally contoured to be complementary with respect to the outer surface of the probe 12 and the strengthening sleeve 16. The internal contour includes an enlarged cavity 40, 42 therein positioned about the outer shoulder 36 of the probe 12.

Externally, each of the insulator parts 18, 20 are of a generally tapered configuration and have three longitudinal ribs namely, 48, 50, 52 and 54, 56, 58. A circumferential rib 60, 62 is formed at the small end thereof.

The bushing 22, shown most clearly in FIG. 2, has a tapered inner surface, and is tightly fitted over the matching tapered surface of the ribs 48 – 62. A lip 64 at the large end of the taper, when the insulator and probe assembly have been properly seated in the bushing 22, is rolled or swaged to secured the assembled parts firmly together. Externally, the bushing 22 is generally cylindrical but includes an integral collar 63 at the outer end thereof. A substantial portion of the two part insulator 18, 20 extends beyond the swaged end of the bushing 22 to provide a measure of mechanical as well as thermal protection for the thermocouple leads as they emerge from the sensor assembly.

A passageway 68 extends through the tire mold at 66, as shown in FIG. 1. The temperature sensing apparatus of FIG. 2 is mounted in that passageway 68 with the thermocouple end 30 of the sensor protruding into the mold cavity. The passageway 68 is formed with an internal shoulder 69 against which the collar 63 of the bushing is seated. The passageway 68 is also provided with an internally threaded counterbore 72. An externally threaded retaining sleeve 70 is screwed into the counterbore 72 with the internal end thereof pressing against the surface of the collar 63 of the bushing 22, clamping that bushing securely in position in the passageway 68.

In FIG. 1, the sensor end of the probe 12 and a part of the support tubing 16 is shown extending into uncured rubber material 74. This rubber material is shown containing a fabric belt 75. It should be noted that the sensing tip of the probe 12 is preferably of a length that allows its insertable end to be displaced outwardly from the fabric belt 75. The uncured rubber material 74 is shown being retained between the tire mold 66 and an expandable bag 76. A hot liquid 78, under pressure, is shown in contact with the inner wall of the of the expandable bag 76. A heater 80 is also shown mounted in the tire mold 66.

MODE OF OPERATION

The temperature sensing apparatus 10, as shown in FIG. 2 is mounted in passageway 68 of a tire mold 66 as shown in FIG. 1.

The tire mold 66 is provided with a number of heaters, such as heater 80, to enable heat to be transmitted through the wall of the mold to the rubber material whereby the temperature of the material can be raised to a temperature where curing of the material is effected.

Expansion of the hot liquid 78 in the expandable bag 76 takes place in a conventional manner, before the curing of the material by the heat from the mold is completed, whereby the rubber material 74 will be in the shape of a rubber tire before stripping it from the mold.

The present invention provides a temperature sensing apparatus 10 to accurately sense when the curing of the rubber material in the tire mold is complete. The resulting tire will therefore have neither the previously referred to undesired undercured characteristic nor the undesired overcured characteristic.

This accurate measurement is obtained because of the following reasons:

1. Since the material of the probe 12 on which the thermocouple wire 26, 28 is mounted has the same low thermal conductivity properties as the rubber material into which it is inserted, the probe 12 will remain at substantially the same temperature as the rubber material 74. It cannot, therefore, adversely affect the rubber material temperature measurement being made by the thermocouple 14.

2. The thin metal support sleeve 16 that surrounds the probe 12 is thermally separated from the thermocouple wires 26, 28 retained in the groove 24 of the probe 12 by the insulation formed about these wires 26, 28 and the insulating cement 44 which fills the remaining space in the groove 24 of the probe 12.

3. The metal sleeve support 16 is thermally isolated from the hot wall of the mold 66 by the insulator 18, 20 made of Polysulfone and by the insulation provided by the air that is trapped in the space on the outer peripheral surface of the members 18, 20 between the ribs 48, 50, 52, 54, 56 and 58.

The metal sleeve 16 is employed to provide added strength and stiffness to the portion of the probe that contacts the rubber material 74 in the mold 66 to thereby prevent that end of the probe from bending, cracking or breaking as stripping of a tire from about this probe 12 and away from the walls of the mold 66 occur.

In practice, it has been shown that a tire mold incorporating probes constructed in accordance with the present invention provides an effective way of accurately determining when the curing temperature of a tire in a mold is reached and further provide a sturdy sensor construction which can withstand numerous tire stripping operations without being bent, cracked or broken.

The embodiments of the invention in which an exclusive property or privilege is claimed as defined as follows:

1. A method of constructing a durable temperature sensing apparatus for accurately measuring the temperature of a rubber material in a mold, including the steps of providing a probe having the same thermal characteristics as said rubber material and comprised of a first portion extending through said mold and a second portion extending into said rubber material, forming a passageway in said probe, inserting an electrically conductive temperature sensor into said passageway so that a temperature sensing end of said sensor forms an end portion of the second portion of said probe, providing a support sleeve extending along a part of the first and second portions of said probe, forming a two part insulator about a circumferential portion of said sleeve that extends along the first portion of said probe and wedging a rigid bushing over a portion of said insulator to retain the bushing in tight engagement with said sleeve.

2. A durable temperature sensing apparatus adapted for mounting in a curing mold and into a material being heated therein to enable an accurate temperature of the material to be made without the heat of said mold affecting the temperature being sensed by said apparatus, said sensing apparatus comprising an insulating probe, said probe having a means to accommodate the positioning of an electrically conductive temperature sensing element in said probe, said electrically conductive temperature sensing element having a temperature sensing end portion positioned at an outer end surface of the probe that is insertable into said material, a rigid probe support sleeve, a first portion of said rigid sleeve being positioned about a first peripheral portion of said probe that is inserted into said material and a second portion of said sleeve being positioned about an adjacent peripheral portion of said probe that extends into said mold, two insulating housing members each positioned about said second portion of said sleeve and about the other end of said probe and sensing, element, and a bushing positioned about and in contact with said two insulating members to retain said sleeve and probe in fixed relation with respect to one another.

3. The temperature apparatus as defined in claim 2 wherein said means in said probe is a continuous groove extending longitudinally along opposite sides and about one end of said probe.

4. The temperature sensing apparatus as defined in claim 2 wherein the probe is constructed of a material having substantially the same thermal transmitting characteristics as said material in said mold.

5. The temperature sensing apparatus as defined in claim 2 wherein said sleeve is made of a stainless steel material and said housing parts comprise means to thermally isolate said sleeve from the curing mold in which said sensing apparatus is mounted.

6. The temperature sensing apparatus as defined in claim 2 wherein mating longitudinal tapered surfaces are formed on the inner wall said bushing and the outer wall of said insulating members to form a tight connection there between the large end portion of said tapered surface of said bushing being positioned about the large end of said insulating members to secure said bushing and insulating members in fixed swaged relationship with one another.

7. The apparatus as defined in claim 2 wherein the inner wall of said bushing and the outer wall of said insulating members are each constructed of frustro conical shaped configuration that are of such dimensions as to retain said last mentioned parts in fixed swaged relationship with one another and said sleeve in fixed compressed relationship with said probe.

* * * * *